March 9, 1965     R. C. MEAD     3,173,053
TRANSISTORIZED ROTATING FIELD PPI DEFLECTION SYSTEM
Filed Aug. 5, 1960     2 Sheets-Sheet 1

INVENTOR
R. C. Mead
BY John E. Wagner
ATTORNEY

March 9, 1965  R. C. MEAD  3,173,053
TRANSISTORIZED ROTATING FIELD PPI DEFLECTION SYSTEM
Filed Aug. 5, 1960  2 Sheets-Sheet 2

INVENTOR
R. C. Mead
BY John E. Wagner
ATTORNEY 3,173,053
TRANSISTORIZED ROTATING FIELD PPI
DEFLECTION SYSTEM
Ronald C. Mead, Van Nuys, Calif., assignor to The
Bendix Corporation, North Hollywood, Calif., a corporation of Delaware
Filed Aug. 5, 1960, Ser. No. 47,819
8 Claims. (Cl. 315—24)

This invention relates to cathode ray tube displays and more particularly to transistorized sweep circuits for fixed coil, rotating field, radial time base (PPI) displays for radar systems.

The PPI type display is commonly employed in search type radar systems to give a pictorial representation of the azimuth position of objects with respect to a reference point such as the system antenna, usually represented at the center of the cathode ray tube display.

Displays of the PPI type are characterized by a rotating radial trace which is ordinarily generated by either of two methods: (1) by mechanically rotating a beam deflecting coil around the neck of the cathode ray tube in synchronism with the antenna rotation or (2) by employing two sawtooth wave generators, designated the X and Y sweep voltage generators, which are connected by means of linear power amplifiers to the horizontal and vertical deflection coils of the cathode ray tube. A sine-cosine potentiometer mechanically coupled to the antenna and generating sine and cosine functions of the angle of the antenna with respect to a reference direction, e.g., north, or the heading of the ship or aircraft carrying the radar system, modifies the X and Y sweep to provide a rotating field.

The first type of system has serious limitations in requiring a motor and mechanical drive system for the deflection coil surrounding the cathode ray tube.

In the second type of system, the need to move the deflection coil is eliminated and consequently is preferred. However, the sawtooth voltage generators and linear power amplifiers impose significant power demands which in no way enhance the level of the received signal. In airborne equipment, particularly, the power demands of the system are important since the power supply will increase markedly in size and weight with the increased power demands, and the power used in the system must be dissipated as heat. It becomes apparent that the minimization of power demands of fixed deflection coil systems therefore has a twofold advantage. Moreover, the necessary sawtooth wave generators and linear power amplifiers, which are notably complex and inefficient, have so added to the cost that fixed coil rotating field sweep circuits are generally not used in practical systems.

The use of transistorized sawtooth wave generators and linear power amplifiers in general constitutes a step forward in lowering the power demands on the system. However, the elimination of these generators and amplifiers would constitute further improvement provided their functions are otherwise performed with less power.

It is a general object of the invention to minimize the power requirements for fixed deflection coil cathode ray tube sweep circuits.

Another object is to provide a transistorized fixed coil, rotating field, radial time base sweep circuit employing no sawtooth wave generators or linear power amplifiers.

These objects are achieved in accordance with this invention, one embodiment of which comprises a sine-cosine potentiometer coupled to generate the sine and cosine function as a function of the angle of orientation of a radar antenna. The sine and cosine function voltages from the potentiometer are introduced into respective transistor current amplifiers, which, in turn, are connected to supply continually varying voltages to individual large capacitors. Each capacitor is intermittently connected to an associated deflection coil for short intervals by a switching transistor. The switching transistors are all intermittently energized by a sweep gate voltage to render them conductive, and the capacitors are thereby connected to deflection coils to produce an electron beam deflecting field. With the deflection coil currents in the several windings varying with the potentiometer orientation, the field is made to rotate. The field increases from zero substantially linearly to maximum value during each gating interval by virtue of the inductance of the coils. A diode clamping network is connected to the switch terminal of each deflection coil winding to control the retrace or return of the coil currents to zero upon the termination of each gating interval.

One feature of the invention resides in the connection of the sine-cosine potentiometer to control the voltage levels of a plurality of capacitors which form the voltage sources for the deflection coil currents during each radial excursion of the electron beam.

Another feature is the utilization of the transient characteristics of the deflection coil itself for generating the time-current variation relationship of the deflection system.

Another feature is the utilization of solid state current amplifiers and switch elements with the resultant minimization of power requirements for the sweep circuit.

These and other features of the invention may be clearly understood from the following detailed description, with reference to the drawing, in which.

Figure 1:
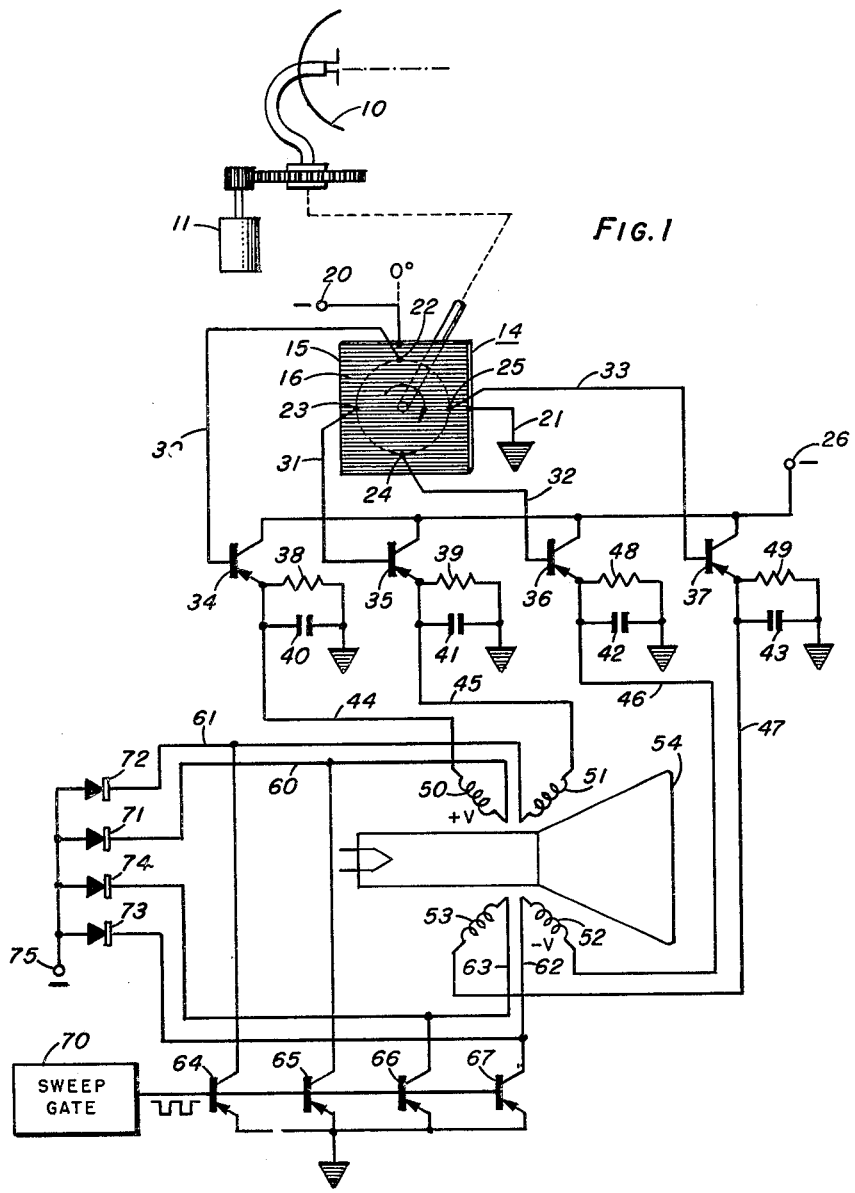
FIG. 1 is a schematic diagram of a radar system sweep circuit incorporating this invention.

Referring now to FIG. 1, the radar system sweep circuit of the invention functions in connection with an antenna 10 shown mounted for rotation about a vertical axis by a motor 11. The antenna is mechanically or electrically coupled to drive a sine-cosine potentiometer 14, including a rotatable card 15 with a fine resistance wire 16 wound thereon in a series of closely spaced parallel turns. One end of the resistance wire 16 is connected to a negative voltage supply 20, which furnishes a voltage of the order of 33 volts between said one end and the midpoint of the resistance wire 16, which is grounded over a lead 21. The other end of the winding is open. With the center tap of the resistance wire 16 grounded, one-half of the potentiometer winding is at ground potential at all times. Four brushes 22, 23, 24 and 25, spaced at 90° intervals around the axis of the card 15 are in contact with exposed portions of the resistance wire 16 so as to derive therefrom either zero voltage or negative voltages varying as a function of the sine and cosine of the angle of orientation of the card 15.

The brushes 22, 23, 24 and 25 of potentiometer 14 are connected by individual leads 30, 31, 32 and 33 to the base electrodes of respective transistors 34, 35, 36 and 37. The transistor collector electrodes are connected to a negative voltage source 26 of the order of 33 volts while the emitter electrodes are connected through individual storage capacitors 40, 41, 42 or 43 to ground. The capacitors 40, 41 42 and 43 are relatively large, being of the order of 100 microfarads and each designed to store a voltage varying with the voltage applied to the base of its associated transistor 34, 35, 36 or 37, which in turn is a function of the angle of orientation of the potentiometer card 15. The capacitors 40, 41, 42 and 43 are shunted by respective resistors 38, 39, 48 and 49, having values of approximately 1000 ohms, to allow the leakage of current therefrom during the falling voltage portion of the potentiometer rotation. The transistors 34, 35, 36 and 37 are all connected as emitter followers with the outputs applied over respective emitter leads 44, 45, 46 and 47 to deflection coils 50, 51, 52 and 53 of a cathode ray tube 54.

The deflection coils, instead of the customary arrangement of one common terminal, all have second leads therefrom connected via conductors 60, 61, 62 and 63 to the collector electrodes of switching transistors 64, 65, 66 and 67, the emitters of which are grounded and the base electrodes of which are all connected to a sweep gate 70. The second terminals of the deflection coils 50, 51, 52 and 53 are also connected via branch leads and clamping diodes 71, 72, 73 and 74 to a negative voltage supply 75, employed in the retrace cycle.

Figure 2:
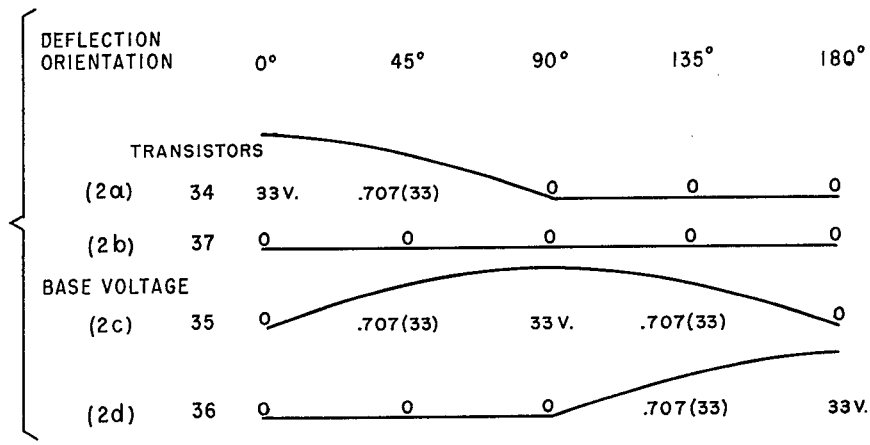
FIG. 2 is a graphical representation of significant voltage and current wave forms in the sweep circuit of FIG. 1 with different antenna orientations.

Referring now to FIG. 2, the curves thereof show variations in the base electrode voltages of transistors 34, 35, 36 and 37 and the deflection coil current during sweep of the antenna 10 (FIG. 1) through one-half revolution from the reference (zero) position. As may be seen in curve 2a, the voltage of the base electrode of transistor 34 is at a maximum value, for example, −33 volts, with the antenna oriented in the 0° direction. At the same time, the base electrodes of transistors 35, 36 and 37 are all at ground potential, and the transistors 35, 36 and 37 are all zero, biased and hence cut off. The emitter voltage follows the base voltage in each transistor and differs only by the base-emitter voltage drop of the transistors which is of the order of 0.15 volt. The voltage on each of the respective capacitors 40, 41, 42 and 43 is substantially equal to the base voltage of its associated transistor. Therefore, capacitor 40 has a potential thereacross of the order of 33 volts, while the capacitors 41, 42, and 43 are effectively grounded at both terminals.

During the normal rotation of the antenna from the zero position, the voltage of the base electrode of transistor 34 falls off sinusoidally to .707 times the maximum voltage of 33 at 45° and to zero at 90° and, since one-half of the potentiometer 14 is grounded, for the remaining 90° of rotation to 180° the base voltage of transistor 34 is equal to zero. Throughout this half-revolution the base electrode and, consequently, the emitter electrode of transistor 37 are at ground potential. Transistor 35 which was cut off at the 0° orientation, following the sine function, rises to 0.707 of the maximum voltage at 45° to the maximum voltage at 90° and falls off again to 0 at 180°. The voltage on the base and emitter electrodes of transistor 36 remains zero during the first 90° of rotation and then rises sinusoidally to the maximum voltage at 180°.

As shown in FIG. 1, the voltages on the respective storage capacitor 40–43 are constantly applied to one end of the respective coils 50–53, but the coils are not energized except during the short intervals when the switching transistors 64–67 are gated conductive. When potential is on any storage capacitor and the associated transistor 64–67 is gated conductive, current builds up in the associated coil at a rate determined primarily by its inductance and the applied potential.

Figure 3:
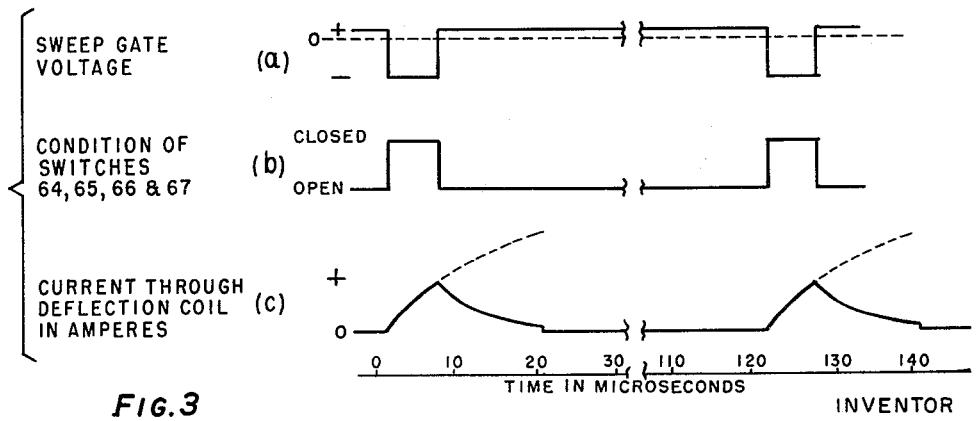
FIG. 3 is a graphical representation of the time-current relationship within a deflection coil during one sweep cycle.

The waveform of the deflection coil current and its relationship to the sweep gate voltage and the condition of switches 64, 65, 66 and 67 may be seen in FIG. 3, which has a time scale measured in microseconds in order to show the current variations which produce a single excursion of the electron beam from the center outward along a radius.

As may be seen in plot 3a, the sweep gate voltage normally rests at a slightly positive value to maintain the switching transistors 64, 65, 66 and 67 cut off. The sweep gate produces a negative voltage excursion for approximately 6.2 microseconds, the sweep duration, and having a repetition rate of 2000 sweeps per second.

The negative voltage excursion of the sweep gate causes each of the switching transistors 64, 65, 66 and 67 to be converted from their normally open or nonconducting condition to their closed or saturated condition by lowering their base voltages to a point where the transistors conduct and present a low impedance in the order of 0.1 ohm to the deflection coil currents. With this completion of the deflection coil circuits, capacitors 40, 41, 42 or 43, as the case may be, and the emitter followers 34, 35, 36 or 37 constitute parallel current sources for the associated winding of induction coil. The current in the winding rises exponentially toward a steady state value, which is a function of the resistance of the coil and the saturation resistance of the switching transistor.

By proper choice of the time constants of the deflection coil circuits, as hereinafter described, the current rise is made substantially linear, giving a reasonably linear sweep of the electron beam.

Upon the opening of the transistor switches, the current in the energized coils decays at an exponential rate.

Figure 4A:
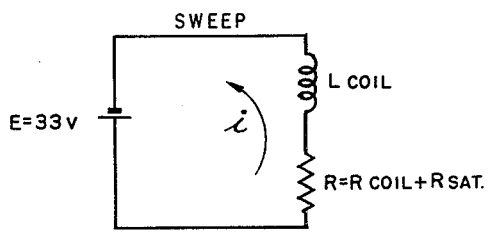
FIGS. 4a and 4b are electrical schematic diagrams of the equivalent circuits during sweep and retrace operation.
Figure 4B:
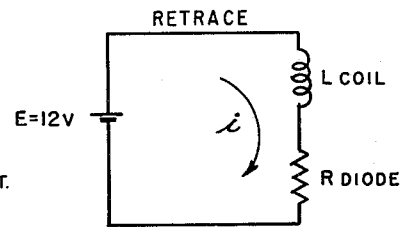

The operation of the sweep circuit may be clearly understood by considering the equivalent circuit of the circuit during both the sweep and the retrace cycles shown in FIGS. 4a and 4b of the drawing. During the sweep operation the combination of the voltage source supplying the sine-cosine potentiometer and the emitter follower with its collector voltage supply all appear as a battery having insignificant internal resistance and a voltage which varies with the sine-cosine potentiometer orientation. Considering the case of the coil 50 and the potentiometer oriented to provide a maximum voltage for that winding, e.g., 33 volts, the equivalent circuit comprises a 33 volt battery with a series circuit thereacross, including the inductance of coil winding 50 and a resistor equal in magnitude to the sum of the resistance of the winding 50 and the saturation resistance of the switching transistor 64. In typical applications the inductance of the winding 50 need be only in the order of 50 microhenries provided its resistance is extremely low in the order of 0.1 ohm, and the saturation resistance of the transistor is in the order of 0.1 ohm, as well. Inductance and resistance requirements for the winding 50 may be attained employing approximately 32 turns of #22 gauge copper wire, and the saturation resistance of the switching transistor is achieved employing germanium junction transistors such as the 2N1073B type of the Red Bank Division of The Bendix Corporation.

The transient current in the deflection coil during the sweep cycle varies as a function of time in accordance with the equation $$i_{t_1} = \frac{E}{R}\left(1 - e^{-\frac{R}{L}t}\right)$$

where e is the voltage impressed on the circuit,
R is the sum of the saturation resistance of the transistor and the resistance of the coil,
L is the winding inductance,
And t is the time in sections.

Employing the constants of $E=33$ volts $R=0.2$ ohms and $t=6.18$ microseconds, which is equal to the sweep time for a ½ mile sweep of the cathode ray tube, the current at the end of the sweep is equal to 4 amperes. This relatively high deflection coil current necessitates the relatively large wire for the winding in order to maintain the coil loss at a low level and the time constant, $L/R$, at least ten times the period of the sweep and retrace cycle. In the case of a deflection coil with the parameters mentioned above, a preferred Q is in the order of 500.

During the retrace portion of the cycle, the equivalent circuit shown in FIG. 4b then becomes that of a battery having a voltage equal to the difference between the supply voltage during the trace cycle, e.g., −33 volts, and the clamping voltage supplied by the source 75 which may be —45 volts. In series across the equivalent 12 volt battery is again the coil with its inductance of 50 microhenries and a resistance of 0.1 ohm and the forward dynamic resistance of the diode 71 which may be in the order of 0.9 to 1.0 ohm. With the opening of the transistor switch 64, the back E.M.F. generated in the coil would cause the transistor 64 to break down if the clamping diode 71 and its negative voltage supply 75 were not present. This clamping diode limits the voltage across the coil to a maximum value equal to the difference between the two voltage supplies 26 and 75, e.g., 12 volts, until such time as the voltage decays below the 12 volt level and thereafter returns exponentially to 0 volts. The clamping time in the example given above is in the order 14.2 microseconds as determined from the equation $$t = \frac{L}{R} ln\left(1 + \frac{I_0 R}{E_2}\right)$$

where $t$ is the time of the end of the clamp period,

L is the inductance of the winding,

R is the equivalent series resistance primarily equal to the forward dynamic resistance of the diode 71, $I_0$ is the initial current shown above to be in the order 4 amperes, and $E_2$ is the equivalent voltage source.

During the retrace cycle the current in the coil decays exponentially in accordance with the equation $$i_t = \frac{E}{R}\left(1 - e^{\frac{-R}{L} t}\right) - I_0\left(e^{\frac{-R}{L} t}\right)$$

approximately to zero, and at the end of the clamped retrace period returns to zero almost instantaneously.

The waveform of the trace and retrace cycles appears in FIG. 3 curve c. It is noted that the retrace time is in the order of twice the trace time but far shorter than the repetition rate so that the beam has sufficient time to return to the center before the next sweep cycle.

It should also be noted that the sweep is substantially linear. The relatively high degree of linearity without the necessity of any compensating circuits is achieved since the time constant of the deflection coil circuit is in the order of 10 times as long as the sweep duration. In the above example the variation of the sweep from a linear sweep is in the order of 1.75% and well within required tolerances for PPI representations.

The minimization of power requirements of the sweep circuit is accomplished in accordance with this invention by the eliminaton of the sawtooth wave generators and linear power amplifiers normally found in fixed coil rotating sweep circuits.

The power loss in the sine-cosine potentiometer is insignificant since the current drawn by the base-emitter circuit is less than one milliampere. The switching transistors 64 through 67 present virtually an open circuit to the deflection coil circuit in the absence of a triggering pulse so that the power consumed by the switching transistor between cycles is virtually zero. When the transistors 64 through 67 are switched to their conducting condition they have an emitter-collector resistance in the order of only 0.1 ohm and consequently insignificant power loss. Therefore the only significant power dissipation occurs in the emitter follower transistors 34 through 37 and the load resistors 38, 39, 48 and 49.

The maximum power dissipation in the sweep circuit occurs at 45° angles when the voltage across two coils is $\sqrt{2}$ times the maximum value of supply voltage, e.g. 33 volts. The sweep current duty factor is $$\frac{6.18 \text{ ms.}}{1000 \text{ ms.}} = 6.18 \times 10^{-3}$$

The total sweep current at this 45° orientation in the above example is equal to 17.4 milliamperes. The emitter follower dissipation is then 17.4 milliamperes times the voltage across the transistors or in the order of 0.4 watt, total for the four transistors.

At the same angle of orientation of 45° the voltage across the resistors 38 and 39 is a function of the supply voltage, e.g., 33 volts and the sine of 45° or 0.707 for a value of 23.3 volts. Where these resistors typically are a 1000 ohms the power dissipated therein is equal to $$\frac{E^2}{R} \text{ or } \frac{23.3^2}{1000}$$

or 0.542 watt. Since two resistors are conducting current equally, the total power dissipated in the resistors at that angular position is 1.08 watts.

It therefore may be seen that the total power dissipated in the sweep circuit is equal to the 1.08 watts in the resistors and the 0.4 watt in the emitter followers for a total of approximately one and one-half watts. The average power dissipated in the sweep circuit during one revolution is slightly less than this value since it was computed for the period of maximum power dissipation.

Therefore, in accordance with this invention a simple sweep circuit is provided employing a minimum of active and passive components and one which requires a minimum of power for operation. The deviation from a linear sweep is slight and well within the requirements for normal PPI representations.

Although for the purpose of explaining the invention a particular embodiment thereof has been shown and described, obvious modifications will occur to a person skilled in the art, and I do not desire to be limited to the exact details shown and described.

I claim:

1. A fixed coil, rotating fields cathode ray tube sweep circuit comprising a sine-cosine potentiometer, a voltage source connected between one terminal and a center tap of said sine-cosine potentiometer, four terminals arranged in quadrature on said sine-cosine potentiometer to generate the sine, cosine, minus sine and minus cosine functions of said source voltage as a function of angular orientation of said potentiometer, individual current amplifiers controlled by the voltage of respective terminals of said sine-cosine potentiometer, voltage-storing means connected to the output of said respective current amplifiers whereby said voltage-storage means are charged to unidirectional potentials varying with the angular orientation of the potentiometer, a plurality of deflection coils for said cathode ray tube arranged to deflect electron beams in quadrature directions, means connecting said deflection coils to respective voltage-storage means, and switch means simultaneously completing the current path from said voltage-storage means through said deflection coils in response to an input gating pulse to produce a current rise in respective deflection coils during the period of said input pulse, the rate of current rise in said deflection coils being a function of the transient response of said deflection coils.

2. A fixed coil, rotating field, radial sweep circuit for cathode ray tubes comprising a source of unidirectional voltage, a sine-cosine potentiometer, means connecting said sine-cosine potentiometer to said voltage source to derive the sine and cosine functions of said voltage varying with the orientation of said potentiometer, means for applying the sine and cosine function voltages derived from said potentiometer to respective voltage-storing means, a first beam-deflection coil including a terminal connected to a respective voltage-storage means, a second beam-deflection coil connected to a respective voltage-storing means, said second beam-deflecting coil being positioned to develop a beam-deflecting field at right angles to the field developed by said first deflection coil, and individual switch means responsive to input gating pulses for completing a conductive circuit through said respective voltage-storing means and deflection coils whereupon a field-producing current rises in said deflecting coils at a rate which is a function of the transient response characteristic of said deflection coils.

3. A radial sweep circuit for cathode ray tubes comprising: a source of unidirectional voltage; a sine-cosine potentiometer connected to said voltage source and connecting four output terminals for deriving the sine, cosine, minus sine and minus cosine functions of said voltage; a plurality of transistors with base electrodes connected to respective output terminals of said sine-cosine potentiometer; second unidirectional voltage source connected to the collector electrodes of said transistors; a deflection coil including four windings positioned to deflect the electron beam of a cathode ray tube in quadrature directions; one end of each winding of said deflection coil connected to an emitter electrode of a respective transistor; and common switch means responsive to an input gating signal for completing the conductive path of said second voltage source through said transistors and individual windings of said deflection coil; the magnitude of the voltage applied to the windings being a function of the base voltage of the transistors and the current rise through the individual windings being a function of the transient characteristics of the respective windings.

4. The combination in accordance with claim 3 wherein a capacitor is connected to store the voltage output of said transistor, said capacitor connected to supply current to said deflection coil winding upon the operation of said switch means.

5. The combination in accordance with claim 4 wherein a resistor is connected across said capacitor whereby the voltage across said capacitor follows the voltage of the emitter electrode of said transistor.

6. In a cathode ray tube sweep circuit the combination of a source of undirectional voltage; a sine-cosine potentiometer connected to said voltage source to provide a plurality of voltages varying with the angle position of said potentiometer; individual transistor emitter followers with base electrodes connected to be controlled by individual voltages derived by said sine-cosine potentiometer; a plurality of electron beam deflecting means, and switch means responsive to input gating signals for completing the conductive path between said individual emitter followers and said beam deflecting means; said conductive path having only insignificant impedance in addition to said beam deflecting means and said switch means.

7. The combination in accordance with claim 6 wherein said beam deflecting means comprises a deflection coil having a time constant in the order of several times the sweep rate.

8. The combination in accordance with claim 6 wherein said switch means comprises a transistor having the emitter-collector circuit in series with said conductive path, the base electrode connected to a source of gating pulses and a saturation resistance in the order of 0.1 ohm.

References Cited in the file of this patent

UNITED STATES PATENTS

| | | |
|---|---|---|
| 2,660,691 | Bertram | Nov. 24, 1953 |
| 2,731,633 | O'Kane et al. | Jan. 17, 1956 |
| 2,745,036 | Symer | May 8, 1956 |
| 2,939,040 | Isabeau | May 31, 1960 |